W. C. SEITZ.
CULTIVATOR ATTACHMENT.
APPLICATION FILED AUG. 21, 1917.
1,259,301.
Patented Mar. 12, 1918.
2 SHEETS—SHEET 1.
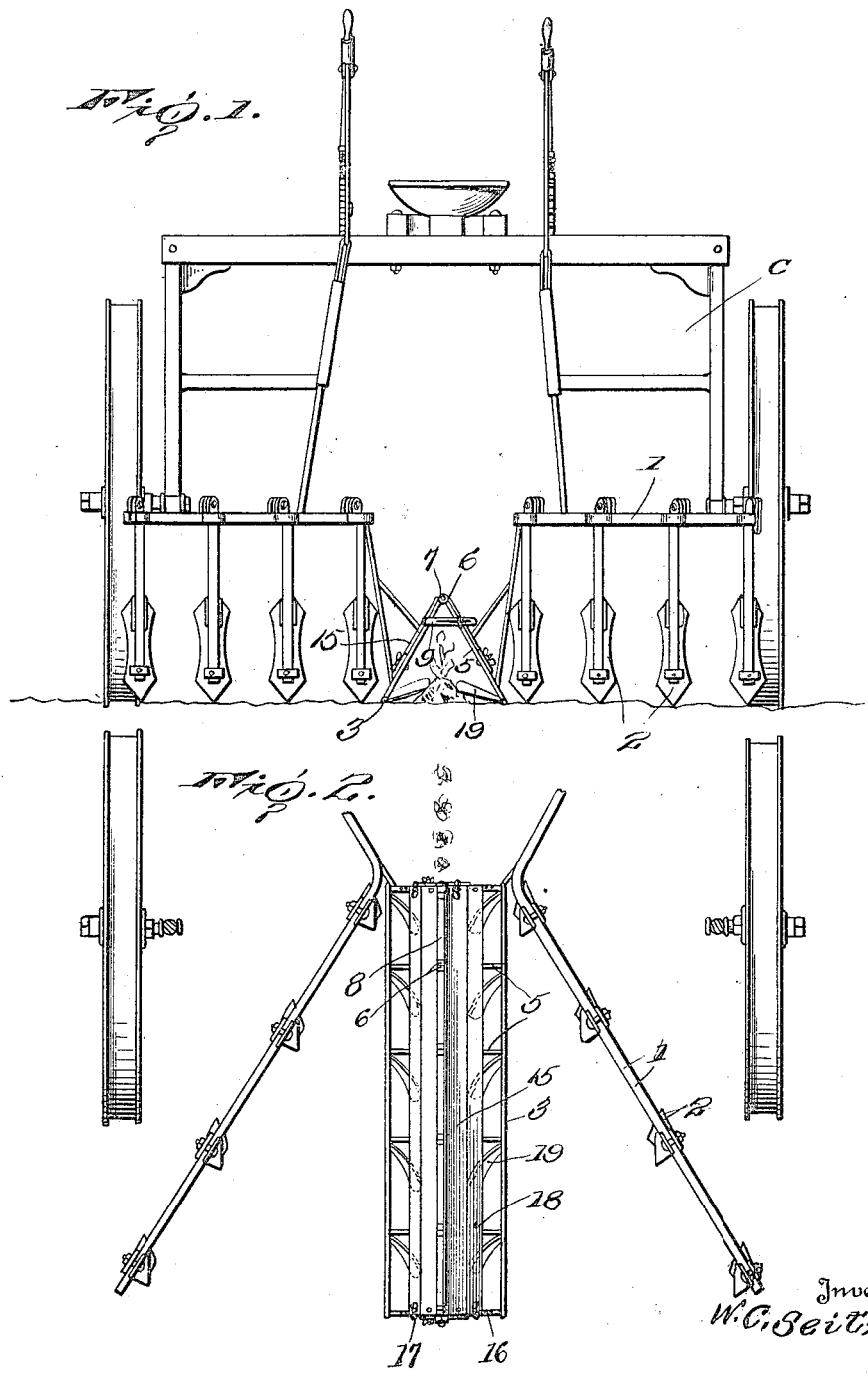

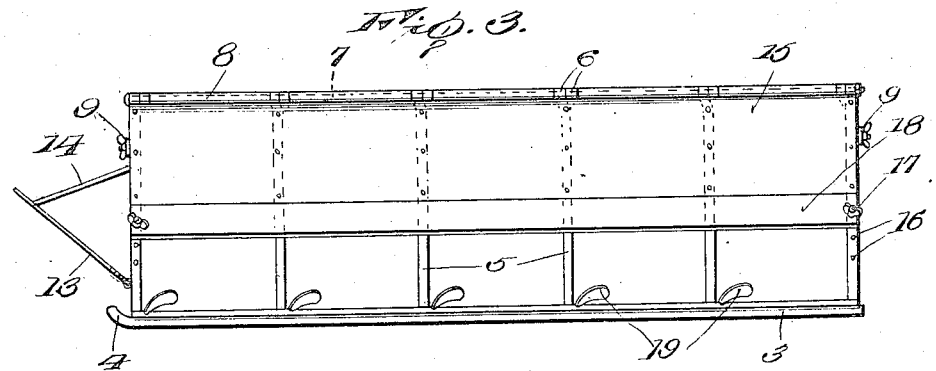
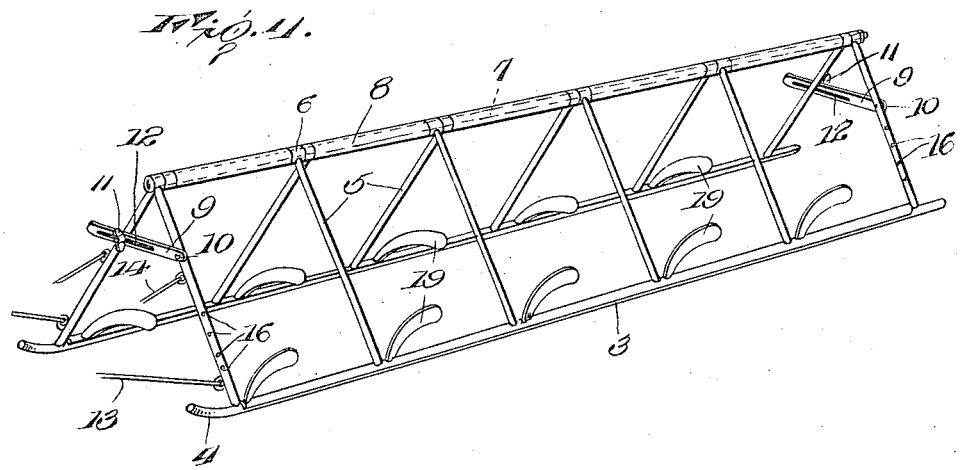
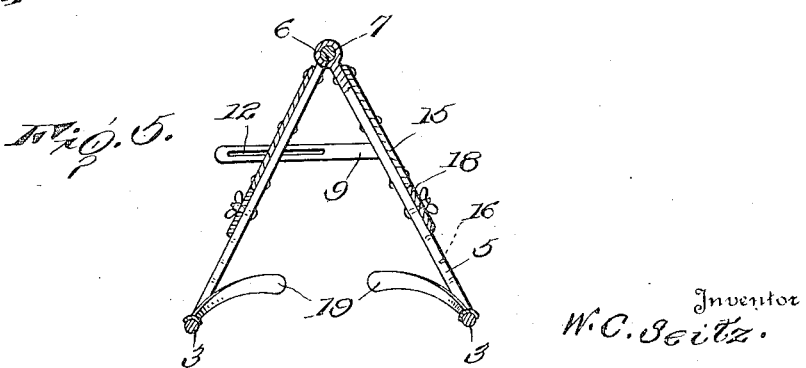

UNITED STATES PATENT OFFICE.

WALTER C. SEITZ, OF BELLVILLE, OHIO.

CULTIVATOR ATTACHMENT.

1,259,301. Specification of Letters Patent. Patented Mar. 12, 1918.

Application filed August 21, 1917. Serial No. 187,417.

*To all whom it may concern:*

Be it known that I, WALTER C. SEITZ, a citizen of the United States, residing at Bellville, in the county of Richland and State of Ohio, have invented certain new and useful Improvements in Cultivator Attachments, of which the following is a specification.

This invention relates to cultivator attachments and has as its object to provide for the protection of young corn or other plants while the soil at the opposite sides of the rows of the plants is being cultivated or loosened. In the use of the ordinary gang cultivator it frequently happens that the young plants in the row are wholly or partly covered by soil thrown up around them by the cultivator shovels. The present invention, therefore, contemplates the provision of an attachment designed to be drawn along between the gangs of the cultivator and so constructed as to regulate the amount of soil thrown up around the roots of the plants and also govern the depth to which the soil is deposited about the said roots.

In connection with the means provided for preventing the young growing plants being wholly, or partly, covered by soil thrown up by the cultivator shovels, the invention contemplates the provision of means for throwing a suitable quantity of soil around the roots of the plants to the required depth, the soil thus deposited being the soil which is loosened by the cultivator shovels.

In the accompanying drawings:

Figure 1 is a rear elevation of a cultivator equipped with the attachment embodying the present invention;

Fig. 2 is a top plan view of the attachment and the associated parts of the cultivator;

Fig. 3 is a side elevation of the attachment;

Fig. 4 is a perspective view of the attachment, the fixed and adjustable guard plates for the frames being removed so as to better illustrate the construction of the frames;

Fig. 5 is a vertical transverse sectional view through the attachment.

In the drawings, the attachment embodying the present invention is illustrated as employed in connection with an ordinary gang cultivator, indicated in general by the reference character C, the gang frames being indicated by the numeral 1 and the cultivator shovels by the numeral 2. These parts being of the ordinary construction require no further description.

The attachment embodying the present invention comprises two frames which are relatively angularly adjustable and which are inclined downwardly from their connected upper sides and each of these frames includes a runner 3 having its forward end upwardly curved, as at 4, so as to pass readily over the ground surface. Extending upwardly from the runners 4, which runners may be of flat bar metal or of rod material, are frame rods 5 which are provided at their upper ends with eyes 6 pivotally fitting a rod 7 which serves to connect the two frames for relative angular adjustment. In order to properly space the upper ends of the frame rods 5, spacing sleeves 8 are preferably arranged at intervals upon the rod 7 in the manner clearly shown in Figs. 3 and 4 of the drawings. At this point it will be understood that the frame structure of the attachment as a whole is of substantially inverted V-form and in order that the attachment may be adjusted to suit varying conditions such, for example, as the size of the plants and the width of the planted hills, bars 9 are pivotally connected each at one end, as at 10, to the front and rear frame rods 5 of the attachment at one side thereof and are adjustably connected to the corresponding frame rods at the other side of the attachment by means of bolts 11 which are fitted through slots 12 formed in the said bars, it being understood that by loosening the bolts the frames of the attachment may be swung toward or away from each other so as to decrease or increase the width of the attachment as a whole after which the bolts may be tightened to secure the frames in their adjusted positions. In order that the attachment may be connected with the gang frames 1, draft rods 13 are connected at their rear ends to the forward ones of the frame rods 5 and to the gang frames 1, as clearly shown in Fig. 1 of the drawings, and brace rods 14 are also connected to the said forward ones of the frame rods 5 and to the draft rods 13.

The frames of the attachment are provided each with a fixed guard plate and an adjustable guard plate. The fixed guard plate of each frame is indicated by the numeral 15 and may be of sheet metal or other suitable material, being permanently secured in place upon the said frame and extending above the upper side of the said frame to a point about mid-way of the height thereof, as clearly shown in Figs. 3 and 4 of the drawings. Below the lower edge of the guard plate 15, the front and rear ones of the frame rods 5 of each frame are formed with a series of openings 16 through which bolts 17 may be selectively fitted, these bolts passing also through the ends of the adjustable guard plate, which is indicated by the numeral 18, and which is narrower than the plate 15 and by reason of the interchangeability of the bolts 17 in the openings 16 they may be arranged to occupy a more or less elevated position upon the respective frame. Thus the guard plates 18 may occupy the positions shown in Figs. 3 and 5 of the drawings or these plates may be adjusted to occupy a lower position if the plants are very young or small. At this point it will be understood that soil which would ordinarily be thrown by the cultivator shovels on to the plants in such quantities as to partly or wholly cover the plants, will, in the use of the attachment, strike the guard plates 15 and 18 and be thus prevented from striking the plants above the roots and extreme lower portions of the stalks.

While the guard plates above described effectually protect the plants from being covered by the soil being thrown up by the cultivator shovels, nevertheless, it is desirable that a certain quantity of loosened soil be deposited around the roots and lower portions of the stalks of the plants and in order that this may be accomplished, a number of coverer blades 19 are mounted upon each of the runners 3 and these blades extend inwardly and slightly upwardly and are curved rearwardly in such manner that as the attachment is drawn along the row of growing plants, the soil thrown by the cultivator shovels through the open lower portion of the attachment will be swept over by the blades on to the roots and lower portions of the stalks of the plants.

From the foregoing description of the invention it will be seen that while by the use of the attachment the plants, during cultivation, are prevented from being completely, or to an undesirable depth, covered with soil, nevertheless, the attachment embodies means for supplying to the roots and lower portions of the stalks of the plants the desired quantity of loosened soil.

Having thus described the invention, what is claimed as new is:

1. In an attachment of the class described, relatively angularly disposed frames, a guard plate upon each frame, runners supporting the frames, and coverer blades carried by the runners.

2. In an attachment of the class described, a frame, a guard plate upon the frame, and a coverer blade mounted at the lower side of the frame and curved upwardly and inwardly from the plane of the guard plate.

3. In an attachment of the class described, frames each provided at their upper sides with hinge lugs, a hinge rod fitted through the lugs whereby to connect the said frames at their said upper sides for relative angular adjustment, the frames being relatively inclined downwardly in diverging planes, a slotted bar pivoted to one of the said frames, a set bolt carried by the other frame and fitting through the said slot in the bar and adapted to be tied whereby to hold the frames in positions of angular adjustment, and a fender plate carried by each frame.

In testimony whereof I affix my signature.

WALTER C. SEITZ. [L. S.]

Copies of this patent may be obtained for five cents each, by addressing the "Commissioner of Patents, Washington, D. C."